(12) United States Patent
Nishiura et al.

(10) Patent No.: US 8,303,852 B2
(45) Date of Patent: Nov. 6, 2012

(54) CARBON BLACK-DISPERSED POLYAMIC ACID SOLUTION COMPOSITION, AND PROCESS FOR PRODUCING SEMICONDUCTIVE POLYIMIDE RESIN BELT THEREWITH

(75) Inventors: Naoki Nishiura, Moriyama (JP); Takashi Kuraoka, Moriyama (JP); Toru Murakami, Ube (JP)

(73) Assignees: Gunze Limited, Ayabe-shi (JP); Ube Industries, Ltd., Ube-shi (JP)

( * ) Notice: Subject to any disclaimer, the term of this patent is extended or adjusted under 35 U.S.C. 154(b) by 586 days.

(21) Appl. No.: 12/441,980

(22) PCT Filed: Sep. 18, 2007

(86) PCT No.: PCT/JP2007/068033
§ 371 (c)(1),
(2), (4) Date: Mar. 19, 2009

(87) PCT Pub. No.: WO2008/035647
PCT Pub. Date: Mar. 27, 2008

(65) Prior Publication Data
US 2009/0236566 A1 Sep. 24, 2009

(30) Foreign Application Priority Data
Sep. 19, 2006 (JP) ................. 2006-252950

(51) Int. Cl.
*H01B 1/06* (2006.01)
*H01B 1/24* (2006.01)
(52) U.S. Cl. ........ 252/511; 252/500; 428/220; 524/495; 528/170; 528/353
(58) Field of Classification Search ............... 252/500, 252/511; 428/32.69, 220; 524/495; 528/170, 528/353
See application file for complete search history.

(56) References Cited

U.S. PATENT DOCUMENTS
6,352,750 B1  3/2002 Kanetake
(Continued)

FOREIGN PATENT DOCUMENTS
CN  1722004 A  1/2006
(Continued)

OTHER PUBLICATIONS
International Search Report of PCT/JP2007/068033, Mailing Date of Oct. 23, 2007.
(Continued)

*Primary Examiner* — Khanh Tuan Nguyen
(74) *Attorney, Agent, or Firm* — Westerman, Hattori, Daniels & Adrian, LLP

(57) ABSTRACT

A carbon black-dispersed polyamic acid solution composition that utilizes carbon black excelling in safety and environmental adaptability and excels in the dispersion stability and fluidity of carbon black dispersed in polyamic acid solution, and that realizes high solid content and high carbon black content. An intermediate transfer belt of polyimide, which produces a transfer image of high quality in a color image-forming apparatus, produced from the polyamic acid solution composition. In particular, a carbon black-dispersed polyamic acid solution composition containing a polyamic acid solution obtained by reaction of approximately equimolar amounts of biphenyltetracarboxylic acid dianhydride and an aromatic diamine, and containing a carbon black of 2 to 6% volatile content produced by oil furnace process, wherein the solid content of the solution composition is 23 wt. % or more and wherein the carbon black content of the solid is in the range of 20 to 30 wt. %.

7 Claims, 2 Drawing Sheets

U.S. PATENT DOCUMENTS

| | | |
|---|---|---|
| 7,008,740 B2 | 3/2006 | Fukuda |
| 7,763,406 B2 | 7/2010 | Nukada et al. |
| 8,097,693 B2 * | 1/2012 | Nishiura et al. ............ 528/353 |
| 2003/0119968 A1 * | 6/2003 | Hara et al. .................... 524/495 |
| 2004/0179871 A1 | 9/2004 | Fukuda |
| 2005/0118361 A1 * | 6/2005 | Natori et al. ............... 428/32.69 |
| 2007/0178264 A1 | 8/2007 | Nishiura et al. |

FOREIGN PATENT DOCUMENTS

| | | |
|---|---|---|
| JP | 05-077252 A | 3/1993 |
| JP | 11-181326 A | 7/1999 |
| JP | 2000-007937 A | 1/2000 |
| JP | 2000-290529 A | 10/2000 |
| JP | 2000-309712 | * 11/2000 |
| JP | 2000-309712 A | 11/2000 |
| JP | 2000-338789 | * 12/2000 |
| JP | 2001-040240 A | 2/2001 |
| JP | 2001-47451 A | 2/2001 |
| JP | 2001-342344 | * 12/2001 |
| JP | 2002-72703 A | 3/2002 |
| JP | 2002-287528 A | 10/2002 |
| JP | 2004-284164 | * 10/2004 |
| JP | 2005-247987 | * 9/2005 |
| JP | 2006-58766 A | 3/2006 |
| JP | 2007-1262 A | 1/2007 |
| WO | 2005/085324 A1 | 9/2005 |

OTHER PUBLICATIONS

Chinese Office Action dated Jun. 28, 2010, issued in corresponding Chinese Patent Application No. 200780034653.

Supplementary European Search Report dated Sep. 15, 2011, issued in corresponding European Patent Application No. 07807437.

* cited by examiner

CARBON BLACK-DISPERSED POLYAMIC ACID SOLUTION COMPOSITION, AND PROCESS FOR PRODUCING SEMICONDUCTIVE POLYIMIDE RESIN BELT THEREWITH

TECHNICAL FIELD

The present invention relates to a carbon black-dispersed polyamic acid solution composition used as a feedstock of semiconductive polyimide belts, and a process for producing a semiconductive polyimide belt using such a composition. The semiconductive polyimide belt produced by the process of the present invention is usable as an intermediate transfer belt of devices having a color image-forming unit, such as electrophotographic copying machines, printers, facsimiles, multifunction devices thereof, and digital printers.

BACKGROUND ART

As the movement toward faster speeds and better quality images in office automation equipment continues at an increasing pace, the precise control of semiconductivity in the intermediate transfer belt is now indispensable to optimize transfer efficiency. Particularly important is the technique to precisely control the electrical resistance of the intermediate transfer belt.

A carbon black-dispersed polyamic acid solution composition, used as a feedstock of the intermediate transfer belt, is generally produced by dispersing and mixing the carbon black added to a polyamic acid solution prepared by polymerization of tetracarboxylic dianhydride and diamine. For operability such as ease of belt formation, the polyamic acid solution is generally a solution of a high-molecular polyamic acid with a weight-average molecular weight of 30,000 or more. This has limited the solubility of the polyamic acid resin in organic polar solvents, making it difficult to increase the content of the resin (for example, at most 20 weight % in terms of a solid content of the solution).

Further, because adding the carbon black to the polyamic acid solution increases the viscosity of the solution, it is difficult to grind the carbon black even with the force of impact between the balls of a disperser such as a bead mill. Formation of a uniform dispersion of carbon black in the polyamic acid solution must involve grinding of the carbon black by a disperser, and a surface phenomenon known as "wetting", in which the pulverizing carbon black is wet by the solvent. Currently, a uniform dispersion of carbon black is obtained by adding a large amount of organic polar solvent with the carbon black. Consequently, the solid content of the resulting high-carbon black-content polyamic acid solution composition can only be increased to generally about 15 to 20 weight %.

With such a low solid content, the polyamic acid solution cannot be easily molded into a thick belt at once. Further, since a large amount of organic polar solvent is required, evaporating and removing the solvent takes a great deal of time. These factors add time and cost to complete the entire process, and accordingly, improved efficiency and economy in the process is necessary.

Patent Document 1 describes a conductive polyimide seamless belt in which conductive carbon blacks having a relatively small powder resistance, such as acetylene black and Ketjen black, are dispersed in polyimide resin.

However, because the conductive carbon blacks used in this publication greatly increase the amount of polyamic acid or solvent adsorbed or retained, there is problematic increased viscosity, reduced dispersibility, and poor dispersion stability, which lead to deficiencies such as reduced processability.

Further, with the intermediate transfer belt containing such a conductive carbon black, non-uniform images are formed even when the volume resistivity is adjusted within a predetermined range. Conceivably, this is due to the structure formation caused by primary aggregation, or conductive chains created by secondary aggregation, both of which occur when the conductive carbon black is dispersed in the polyimide resin, and create severely impaired images.

Patent Document 2 discloses a semiconductive belt that contains 1 to 30 parts by weight of one or more kinds of carbon black having a volatile content of at least 2% and less than 30% with respect to 100 parts by weight of binder resin. According to the publication, a carbon black content in excess of 30 parts by weight is not preferable because it makes the molded semiconductive belt brittle, and destroys the characteristic mechanical properties (here, high tenacity) of the binder resin.

Patent Document 3 discloses a semiconductive polyimide belt that uses a conductive carbon black whose volatile content, primarily volatile acids, is 10% to 25%. According to the publication, a carbon black volatile content of less than 10% reduces the dispersibility of the carbon black, and cannot provide a sufficient electrical resistance.

According to a channel process, carbon black is produced in low-temperature air; the surface of the product carbon black therefore contains large numbers of oxygen-containing functional groups, such as a carboxyl group, a phenolic hydroxyl group, a quinone group, and a lactone group. These oxygen-containing functional groups are known to improve the dispersibility of the carbon black in the polyamic acid solution. However, the volatile content of the carbon black produced by a channel process contains large amounts of impurities such as sulfur and undecomposed feedstock hydrocarbons (PAH), in addition to hydrogen and oxygen. The undecomposed feedstock hydrocarbons (PAH), in particular, react with nitrogen oxide to produce nitro compounds, which are converted into highly carcinogenic, polycyclic aromatic nitro compounds. Therefore, the use of carbon black produced by a channel process is not desirable in terms of safety and environmental adaptability.

On the other hand, in an oil furnace process, the carbon black is produced by the pyrolysis of hydrocarbons in a reducing atmosphere under the heat of a high-temperature gas of combusting fuel equal to or greater than 1,400° C. The carbon black produced by an oil furnace process is preferable because it contains only small amounts of oxygen and impurity inside or on the surface of the particles, and therefore permits the formation of crystallites. Drawbacks of the carbon black produced by an oil furnace process, however, are poor dispersibility in the polyamic acid solution, aggregation during storage, and the like.

Patent Documents 4 through 7 report various oxidation methods in which carbon black produced by an oil furnace process is modified to add oxygen functional groups to the surface, in order to produce carbon black that can be suitably used in applications such as in liquid toners, ink, and coating materials.

Patent Document 1: JP-A-5-77252
Patent Document 2: JP-A-2000-309712
Patent Document 3: JP-A-2001-47451
Patent Document 4: JP-A-11-181326
Patent Document 5: JP-A-2000-7937
Patent Document 6: JP-A-2000-290529
Patent Document 7: JP-A-2001-40240

DISCLOSURE OF THE INVENTION

Problem to be Solved by the Invention

The present invention was made in view of the foregoing problems, and an object of the invention is to provide a carbon black-dispersed polyamic acid solution composition of a high solid content and a high carbon black content, in which a carbon black excelling in both safety and environmental adaptability is dispersed in a polyamic acid solution with improved fluidity and improved dispersion stability.

Another object of the invention is to provide a polyimide intermediate transfer belt that uses the polyamic acid solution composition, and is therefore capable of producing a high-quality transfer image in a color image-forming unit.

Means for Solving the Problem

In order to precisely control the semiconductivity of an intermediate transfer belt, the inventors of the present invention focused on the dispersibility of carbon black in the polyimide resin constituting the matrix of the intermediate transfer belt.

For example, referring to FIG. 1, there are three possible types of conduction models of carbon black in a resin: (A) partially continuous, (B) discontinuous, and (C) continuous. The conductivity of the polyimide belt can be illustrated in terms of the equivalent circuit shown on the right-hand side of each conduction model, in which R is the resistor created by the effect of the carbon black chain, and C is the capacitor due to the tunnel effect. FIG. 2 shows micrographs individually representing the states (A), (B), and (C). In (A), image defects occur by the microscopic resistance variations caused by aggregation of the carbon black. In (B), uniform dispersion enables control of semiconductivity but with varying resistivities due to mechanical or electrical stress. In (C), conductivity is stable, and is determined almost solely by the powder resistance of the carbon black.

It is therefore necessary that the carbon black be uniformly dispersed in the resin as continuously as possible, instead of being dispersed partially continuously or discontinuously, as in FIG. 1. To this end, increasing the carbon black load of the resin was considered to be important. More specifically, it is important to increase the carbon black content of the solid in the carbon black-dispersed polyamic acid solution composition.

The inventors of the present invention found that, when carbon black produced by an oil furnace process is subjected to an oxidation treatment to provide a high powder resistance such that the volatile content is 2% to 6%, the carbon black can be uniformly dispersed in a high content (about 20 to 30 weight % of the solid) in a polyamic acid solution composition. The inventors also found that an intermediate transfer belt produced by rotational molding using the polyamic acid solution composition can have a uniform semiconductivity of a desirable range (surface resistivity of about $10^9$ to $10^{14}$ Ω/sq.), and therefore enables formation of a high-quality transfer image. The present invention was completed upon further studies based on these findings.

Specifically, the present invention provides a carbon black-dispersed polyamic acid solution composition, and a semiconductive polyimide resin belt obtained by using the polyamic acid solution composition, as follows.

Item 1. A carbon black-dispersed polyamic acid solution composition, including: a polyamic acid solution obtained by a reaction of substantially equimolar amounts of biphenyltetracarboxylic dianhydride and aromatic diamine; and a carbon black of 2% to 6% volatile content produced by an oil furnace process, the solution composition having a solid content of 23 weight % or more, and the solid having a carbon black content of 20 to 30 weight %.

Item 2. A carbon black-dispersed polyamic acid solution composition according to Item 1, wherein the carbon black has a pH of 2 to 3, a nitrogen adsorption specific surface area of 60 to 150 $m^2/g$, and a DBP absorption of 40 to 120 ml/100 g, and contains undecomposed feedstock hydrocarbon (PAH) in an extracted amount of 10 ppm or less.

Item 3. A carbon black-dispersed polyamic acid solution composition according to Item 1 or 2, wherein the carbon black has been subjected to an oxidation treatment using an oxidizing agent that contains ozone.

Item 4. A carbon black-dispersed polyamic acid solution composition according to Item 1, wherein the polyamic acid solution is a solution of polyamic acid having a weight-average molecular weight of 30,000 or less.

Item 5. A carbon black-dispersed polyamic acid solution composition according to Item 1, wherein the biphenyltetracarboxylic dianhydride contains about 10 to 80 mol % asymmetric 2,3,3',4'-biphenyltetracarboxylic dianhydride, and wherein the aromatic diamine is 4,4'-diaminodiphenyl ether.

Item 6. A process for producing a semiconductive polyimide resin belt by rotational molding of a carbon black-dispersed polyamic acid solution composition of any one of Items 1 through 4 into a tube, followed by imidization by a heat treatment, the process including:

(1) applying the carbon black-dispersed polyamic acid solution composition in uniform thickness over an inner surface of a cylindrical mold being rotated at a centrifugal acceleration about 0.5 to 8 times the gravitational acceleration;

(2) forming a self-supporting (non-flowing) coating by applying a heat of about 100° C. to 140° C. to the cylindrical mold being rotated at a centrifugal acceleration about 0.5 to 8 times the gravitational acceleration; and (3) imidizing the coating at a temperature of about 300° C. or more, with the coating being adhered to the inner surface of the cylindrical mold.

Item 7. A semiconductive polyimide resin belt produced by a process of Item 6.

Item 8. A semiconductive polyimide resin belt including a polyimide resin, and carbon black of 2% to 6% volatile content produced by an oil furnace process that is uniformly dispersed in the polyimide resin, the semiconductive polyimide resin belt containing the polyimide resin in 70 to 80 weight %, and the carbon black in 20 to 30 weight %, and having a surface resistivity of $10^9$ to $10^{14}$ Ω/sq.

Item 9. A semiconductive polyimide resin belt according to Item 8, wherein the semiconductive polyimide resin belt has an average thickness of 50 μm to 150 μm.

Item 10. An intermediate transfer belt for an electrophotographic apparatus, wherein the intermediate transfer belt is formed of a semiconductive polyimide resin belt of any one of Items 7 through 9.

The present invention is described in detail below.

A carbon black-dispersed polyamic acid solution composition of the present invention includes a polyamic acid solution, and a carbon black of 2% to 6% volatile content obtained by an oxidation treatment of carbon black produced by an oil furnace process, the solution composition having a solid content of 23 weight % or more, and the solid having a carbon black content of 20 to 30 weight %. The solution composition has a high solid content, and the carbon black is uniformly dispersed in the polyamic acid solution. As used herein, the "solid content" refers to the content as measured according to the method described in the Examples.

1. Carbon Black of 2% to 6% Volatile Content

The carbon black used in the present invention has a volatile content of 2% to 6% adjusted by an oxidation treatment of carbon black produced by an oil furnace process.

Carbon black production using an oil furnace process has currently become mainstream because it is more yielding and productive, and less harmful to the environment than the channel process. However, compared with the carbon black produced by the channel process, which blends well with the polyamic acid solution and excels in dispersibility because of its high volatile content (usually, 10.0 or more), the carbon black produced by the oil furnace process has a considerably lower volatile content (usually, 1.5% or less), which makes the carbon black poorly dispersive in the polyamic acid solution, and causes aggregation during storage. The notably low volatile content of the carbon black produced by the oil furnace process is attributed to its production method, in which hydrocarbons are pyrolyzed in a reducing atmosphere under the heat of a high-temperature gas of combusting fuel, as opposed to the low-temperature air used in the channel process.

In the present invention, the carbon black produced by the oil furnace process is modified (by oxidation treatment) to increase the volatile content to 2% to 6%.

In the oxidation treatment, the type of oxidizing agent used for oxidation is particularly important. Examples of the oxidizing agent usable in the invention include: nitrogen oxides including nitric acid; ozone; hypochlorous acid; and sulfuric acid gas. Oxidizing agents containing ozone, especially ozone, are particularly suitable because these oxidizing agents leave little residue in the treated carbon black, and decompose the undecomposed feedstock hydrocarbons (PAH). The amount of undecomposed feedstock hydrocarbons (PAH) should be kept as low as possible, specifically 10 ppm or less.

It is important that the volatile content of the carbon black produced by the oil furnace process be adjusted to 2% to 6%, preferably about 2.5% to about 5%, by the oxidation treatment.

The carbon black of 2% to 6% volatile content has oxygen functional groups, such as a phenolic hydroxyl group, a carbonyl group, and a carboxyl group (particularly a carboxyl group) on the surface. These oxygen functional groups improve fluidity and dispersion stability of the carbon black in the polyamic acid solution. Compatibility with the polyimide resin is also improved.

In the carbon black produced by the oil furnace process, the volatile content and the powder resistance are almost proportional to each other, provided that the specific surface area and the dibutyl phthalate adsorption (DBP absorption) remain constant. Since the oxygen functional groups (corresponding to the volatile content) on the surface of the carbon black act as an insulator inhibiting the flow of π electrons, the carbon black produced by the oil furnace process, and that subjected to oxidation treatment has a greater powder resistance than those without oxidation treatment. Thus, by setting the volatile content within the foregoing range, the powder resistance of the carbon black can be controlled in a high range of from about 3 to 30 Ω·cm.

This makes it possible to increase the carbon black load of the polyimide resin (a carbon black content of 20 to 30 weight % in the polyimide resin) for the purpose of setting the surface resistivity of the polyimide resin belt within a desired range ($10^9$ to $10^{14}$ Ω/sq.). The resulting polyimide resin belt therefore has conductivity imparted by the carbon black chain, and stable electrical properties not easily affected by external environment and applied voltage. In other words, the carbon black content in the solid in the carbon black-dispersed polyamic acid solution composition can be controlled in a high range of 20 to 30 weight %.

As the carbon black load (content) of the polyimide resin is increased, in the graph plotting the surface resistivity of the polyimide resin against the carbon black load, the slope representing the surface resistivity of the polyimide resin becomes more gradual (see, for example, Example 4 and FIG. 3). That is, changes in the surface resistivity of the polyimide resin become smaller for a given change in the carbon black load. There accordingly will be no abrupt fluctuations of surface resistivity with respect to small changes in the amount of carbon black during belt production, making it easier to control the surface resistivity of the belt.

Note that the volatile content of the carbon black is measured according to the method described in the Examples below. Carbon blacks with a volatile content of less than 2% (for example, Mitsubishi carbon black MA-11 and MA-100, available from Mitsubishi Chemical Corporation; Printex 95 and Printex L6, available from Degussa) have a compatibility problem with the polyamic acid solution, and tend to form a secondary aggregation by the Van der Waals force after being dispersed.

Almost all carbon blacks produced by the channel process have a volatile content in excess of 6% (for example, Color Black FW 200, Special Black 5, Special Black 4, and Printex 150T; Degussa), and contain large amounts of impurity such as sulfur and undecomposed feedstock hydrocarbons (PAH), in addition to hydrogen and oxygen. These impurities degrade the characteristic mechanical properties of the binder resin such as the polyimide resin. When the volatile content of the carbon black produced by the oil furnace process is increased in excess of 6% by the oxidation treatment, the powder resistance increases too much (insulating carbon black is produced), and the surface resistivity of $10^9$ to $10^{14}$ Ω/sq., required for the intermediate transfer belt, cannot be realized.

The carbon black used in the present invention has a nitrogen adsorption specific surface area (JIS K6217) of 60 to 150 $m^2/g$, preferably 80 to 130 $m^2/g$. Generally, in the oxidation of carbon black using various methods, the number of oxygen functional groups increases as the specific surface area is increased. However, the powder resistance of the carbon black, and the properties of materials including the carbon black, correlate not with the absolute number of the oxygen functional groups, but with the number of oxygen functional groups present in a unit surface of the carbon black.

A specific surface area less than 60 $m^2/g$ cannot provide compatibility with the polyamic acid solution, and the powder resistance is not sufficiently high. On the other hand, a specific surface area above 150 $m^2/g$ will result in a carbon black having a large specific surface area, or more specifically, a carbon black of small primary particle sizes, or a carbon black with pores. The powder resistance of such carbon blacks cannot be increased even with the oxygen functional groups. In either case, the carbon black content of the solid cannot be increased in the product semiconductive polyimide resin belt (for example, a high carbon black load of 20 weight % or more cannot be obtained). That is, the product semiconductive polyimide resin belt is of a low carbon black load.

The carbon black used in the present invention has a pH of 2 to 4, preferably 2 to 3.

Further, the carbon black used in the present invention has a dibutyl phthalate absorption (DBP absorption) of 40 to 120 ml/100 g, preferably 50 to 90 ml/100 g. When the DBP absorption exceeds 120 ml/100 g, the powder resistance of the carbon black no longer increases even with the oxidation treatment. In this case, the carbon black content of the solid in the product semiconductive polyimide resin belt cannot be increased to 20 weight % or more. When the DBP absorption is less than 40 ml/100 g, the powder resistance becomes too high. In this case, the carbon black content in the solid must be increased in excess of 30 weight % to obtain a semiconductive polyimide resin belt.

The amount of undecomposed feedstock hydrocarbons (PAH) should be kept as low as possible. Specifically, 10 ppm or less is sufficient to inhibit reaction with nitrogen oxide, and the generated nitro compound will be negligible. The undecomposed feedstock hydrocarbons (PAH) are decomposed by the oxidation treatment (particularly, by the oxidation treatment using ozone).

2. Carbon Black-Dispersed Polyamic Acid Solution Composition

The carbon black-dispersed polyamic acid solution composition of the present invention is prepared by dispersing a carbon black of 2% to 6% volatile content in a polyamic acid solution obtained by the reaction of substantially equimolar amounts of biphenyltetracarboxylic dianhydride and aromatic diamine in an organic polar solvent.

Specific examples of the biphenyltetracarboxylic dianhydride include 2,3,3',4'-biphenyltetracarboxylic dianhydride (a-BPDA), 3,3',4,4'-biphenyltetracarboxylic dianhydride (s-BPDA), 2,2',3,3'-biphenyltetracarboxylic dianhydride (i-BPDA), and a blend of two or more kinds of these biphenyltetracarboxylic dianhydrides.

The aromatic diamine may be, for example, diaminodiphenyl ether. Specific examples include 4,4'-diaminodiphenyl ether, 3,3'-diaminodiphenyl ether, and 3,4'-diaminodiphenyl ether.

The organic polar solvent is preferably an aprotic organic polar solvent. Specific examples include N-methyl-2-pyrrolidone (hereinafter, "NMP"), N,N-dimethylformamide, N,N-diethylformamide, N,N-dimethylacetoamide, dimethylsulfoxide, hexamethylphosphoramide, and 1,3-dimethyl-2-imidazolidinone. A mixed solvent containing one or more of these solvents may be used as well. NMP is particularly preferable.

A typical example of a polyamic acid solution of the present invention is a polyamic acid solution obtained by the reaction of two or more kinds of biphenyltetracarboxylic dianhydrides, and aromatic diamine in an organic polar solvent. The biphenyltetracarboxylic dianhydrides preferably contain both symmetric and asymmetric biphenyltetracarboxylic dianhydrides. More preferably, the biphenyltetracarboxylic dianhydrides contain 10 to 80 mol % (preferably, 15 to 50 mol %) of asymmetric 2,3,3',4'-biphenyltetracarboxylic dianhydride, and 90 to 20 mol % (preferably, 85 to 50 mol %) of symmetric biphenyltetracarboxylic dianhydride. Particularly preferably, the biphenyltetracarboxylic dianhydrides contain 20 to 30 mol % of asymmetric 2,3,3',4'-biphenyltetracarboxylic dianhydride, and 80 to 70 mol % of 3,3',4,4'-biphenyltetracarboxylic dianhydride.

The upper limit of the weight-average molecular weight of the polyamic acid in the polyamic acid solution is 30,000, preferably 25,000. The lower limit is 3,000, preferably 6,000. Molecules with a weight-average molecular weight of less than 3,000 exist as oligomers, and accordingly there is no entanglement with the inner molecules. As a result, a brittle layer is formed on the surface of the semiconductive polyimide resin belt.

The molecular weight of the polyamic acid can be adjusted by any known method. For example, the following two methods can preferably be used. In one method, biphenyltetracarboxylic dianhydride and aromatic diamine are polymerized at a molar ratio of 0.5 to 0.95 to form a polyamic acid of a predetermined molecular weight, and biphenyltetracarboxylic acid is added as required to make the molar ratio of biphenyltetracarboxylic acid and aromatic diamine substantially 1:1 (see, for example, JP-B-1-22290). In another method, a reaction of substantially equimolar amounts of biphenyltetracarboxylic dianhydride and aromatic diamine is performed in the presence of a predetermined amount of a compound, such as water, that inhibits an increase of molecular weight (see, for example, JP-B-2-3820).

The polyamic acid solution containing both symmetric and asymmetric biphenyltetracarboxylic dianhydrides can increase the solubility of the polyamic acid in the organic polar solvent, making it possible to adjust the solid content of the polyamic acid solution in a high range of 23 weight % or more, and particularly 25 to 50 weight %. Such a high solid content is made possible in part by the increased solubility of the polyamic acid in the solvent conferred by the controlled low molecular weight of the polyamic acid. The high solid content makes it easier to produce belts having a thickness of 100 μm or more. Further, because the amount of solvent used is small, the solvent does not increase the cost, and can easily be removed by evaporation.

When the amount of evaporating solvent is large, it may increase the buoyancy and the surface tension that cause heat convection or evaporative convection in the drying step. Viscosity and density changes that occur as the solvent evaporates may also increase. These can cause a phenomenon known as "floating" which occurs when the dispersion state of the carbon black is nonuniform. However, because the polyamic acid solution composition contains a reduced amount of solvent, such problems are minimized in the present invention.

The method of mixing the carbon black in the polyamic acid solution is not particularly limited, as long as the carbon black is uniformly mixed and dispersed in the polyamic acid solution. For example, methods using a sand mill, a bead mill, an ultrasonic mill, and a three-roll mill can be used. The average particle diameter of the mixed and dispersed carbon black is generally from about 0.1 μm to about 0.5 μm, preferably from about 0.2 μm to about 0.4 μm.

The amount of carbon black added to the polyamic acid solution is decided so that the carbon black content in the solid in the polyamic acid solution composition is 20 to 30 weight %. The lower limit is 20 weight % because it is the amount necessary to ensure stability and suitable removal of charge in products such as the intermediate transfer belt of a color image-forming unit, and to stably form a high-quality transfer image over extended time periods. The upper limit is 30 weight % or less to provide enough strength for the intermediate transfer belt, and to protect the intermediate transfer member from damage and other problems during extended use.

Note that the composition may include additives such as imidazole compounds (2-methylimidazole, 1,2-dimethylimidazole, 2-methyl-4-methylimidazole, 2-ethyl-4-ethylimidazole, 2-phenylimidazole), and surfactants (including fluorosurfactants), provided that the addition of such additives is not detrimental to the effect of the present invention.

The product polyamic acid solution composition includes a uniformly dispersed carbon black, making up 20 to 30 weight % of the solid in the composition.

The viscosity of the carbon black-dispersed polyamic acid solution composition should be, for example, 0.5 to 50 Pa·s, preferably 1 to 10 Pa·s, in order to minimize degeneration of the carbon black dispersion. The average particle diameter of the carbon black in the solution is preferably from 0.1 µm to 0.5 µm. The maximum particle diameter is preferably 1 µm or less.

3. Process of Producing Semiconductive Polyimide Belt

A semiconductive polyimide belt of the present invention is produced by molding the carbon black-dispersed polyamic acid solution composition into a tube using rotational molding, followed by a heat treatment.

Specifically, the method includes:

(1) applying a polyamic acid solution composition containing uniformly dispersed carbon black in uniform thickness over the inner surface of a cylindrical mold being rotated at a low centrifugal acceleration 0.5 to 8 times the gravitational acceleration;

(2) forming a self-supporting (non-flowing) coating by evaporating the solvent under the heat of 100° C. to 140° C. applied to the cylindrical mold being rotated at a low centrifugal acceleration 0.5 to 8 times the gravitational acceleration; and (3) imidizing the coating at a temperature of about 300° C. or more, with the coating being adhered to the inner surface of the cylindrical mold.

The following describes a process of producing a semiconductive polyimide belt using the carbon black-dispersed polyamic acid solution composition (hereinafter, also referred to simply as "liquid feedstock").

The liquid feedstock is applied in uniform thickness over the inner surface of the cylindrical mold being rotated at a low centrifugal acceleration 0.5 to 8 times the gravitational acceleration. More specifically, because the liquid feedstock is supplied at a centrifugal acceleration as low as 0.5 to 8 times the gravitational acceleration, the shear force exerted on the liquid feedstock in the direction of rotation will be small, making it possible to suppress the orientation of the molecular chains, and the structure orientation of the fillers such as the carbon black. When the centrifugal acceleration is less than 0.5 times the gravitational acceleration, there is a risk that the supplied liquid feedstock falls (drips) off, instead of adhering to the inner surface of the cylindrical mold. The centrifugal acceleration is at most 8 times the gravitational acceleration, because it otherwise causes the liquid feedstock to flow under the centrifugal force, in addition to exerting a shear force in the direction of rotation, and causing the orientation of the molecular chains and the structure orientation of the fillers such as the carbon black.

The centrifugal acceleration (G) employed in the present invention is given by the following formula.

$$G(m/s^2) = r \cdot \omega^2 = r \cdot (2 \cdot \pi \cdot n)^2$$

where r is the radius (m) of the cylindrical mold, ω the angular velocity (rad/s), and n the number of rotations per second (rpm for the number of rotations per 60 seconds). The reference gravitational acceleration (g) is 9.8 (m/s²).

As the means to supply the liquid feedstock, the liquid feedstock is applied in uniform thickness over the inner surface of the cylindrical mold as it is moved along the rotational axis of the rotating cylindrical mold while discharging by a nozzle method or a spray method. The shape of the coating head is not particularly limited, and it may be, for example, circular or rectangular, depending on applications. Further, the coating head is not limited to a particular size, and it may be designed taking into account the viscosity of the discharged liquid feedstock. The method of applying discharge pressure is not particularly limited, and the pressure may be applied by using, for example, a mohno pump or a gear pump that accommodates compressed air or high-viscosity liquid.

Because the liquid feedstock is applied in uniform thickness over the inner surface of the cylindrical mold, it will not be necessary to form a coating of a uniform thickness by the high-speed rotation of the cylindrical mold, or more specifically, by causing the liquid feedstock to flow using the centrifugal force. In rotational molding using centrifugal force, the supplied liquid feedstock is uniformly flown over the inner surface of the cylindrical mold under the centrifugal force. The flow caused by the centrifugal force causes the carbon black particles to align and form structures along the direction of flow. Often, this has adverse effects on the electrical properties of the polyimide intermediate transfer belt. The method of the present invention, not employing high-speed rotation, is nearly free from such problems.

It is preferable that the inner surface of the cylindrical mold be coated with a mold release to prevent adhesion of the polyimide resin. The type of mold release is not particularly limited, as long as it is not affected by the solvent of the liquid feedstock, or by the water vapor generated from the resin during the heat reaction.

In the liquid resin coating-forming step, the solvent is evaporated at a temperature of 100° C. to 140° C. to make the solid content 40 weight % or more, with the cylindrical mold being rotated at a low centrifugal acceleration 0.5 to 8 times the gravitational acceleration. This forms a self-supporting coating on the inner surface of the cylindrical mold.

In the polyimide resin coating-forming step, the coating is heated to about 250° C. for 60 to 120 minutes, with the coating being adhered to the inner surface of the cylindrical mold. The temperature and time vary depending on the type of polyimide resin. The coating is further heated to a temperature that completely converts the resin to polyimide, for example, at 300° C. to 350° C. for 30 to 90 minutes, so that a polyimide resin coating is formed. Because the coating is formed while it is adhered to the inner surface of the cylindrical mold, the shrinkage caused by imidization reaction or solvent evaporation can be suppressed, and the exerted stress can act to uniformly orient the polymer chains along the in-plane direction.

As described above, the carbon black-dispersed polyamic acid solution composition has a high solid content, and the solid contains a high carbon black content. The semiconductive polyimide resin belt molded of the carbon black-dispersed polyamic acid solution composition has a high carbon black content, and sufficient mechanical properties, such as high strength, characteristic of the polyimide resin.

The average thickness of the semiconductive polyimide belt is adjusted in a range of generally from about 50 µm to about 150 µm, preferably from about 60 µm to about 120 µm.

The surface resistivity is adjusted in a range of generally from about $10^9$ to about $10^{14}$ Ω/sq., preferably from about $10^{10}$ to about $10^{13}$ Ω/sq.

The semiconductive polyimide belt, produced as above, can be used as, for example, the intermediate transfer belt of a color image-forming unit in an electrophotographic apparatus. In this case, stability and suitable removal of charge are ensured, and a stable, high-quality transfer image is produced over extended time periods.

Effects of the Invention

A carbon black-dispersed polyamic acid solution composition of the present invention excels in the fluidity and dispersion stability of the carbon black in the solution, and has a high solid content with a minimum amount of solvent. The composition also has a high carbon black content of the solid. The carbon black used for the composition has an extremely low impurity content, and excels in safety and environmental adaptability. Further, a polyimide resin belt produced from the polyamic acid solution composition can be used as, for example, an intermediate transfer belt to realize accurate transfer in a color image-forming unit, and form a stable, high-quality transfer image over extended time periods.

BEST MODE FOR CARRYING OUT THE INVENTION

Figure 1:
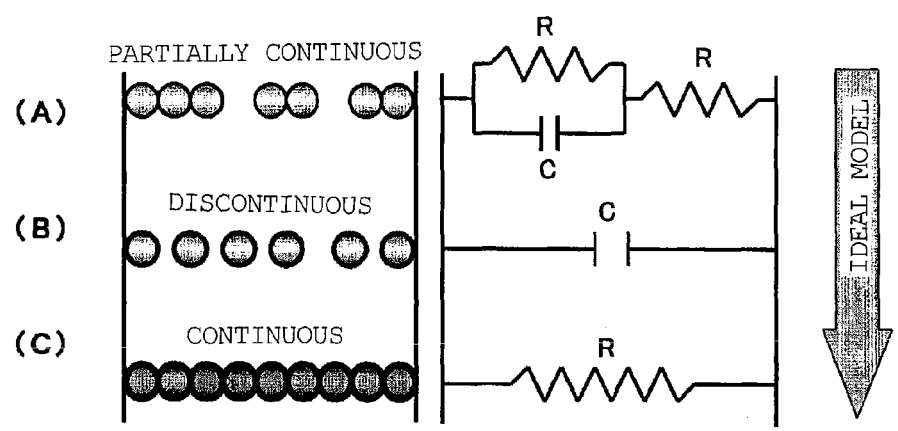
FIG. 1 is a diagram representing conduction models of carbon black in a resin.
Figure 2:
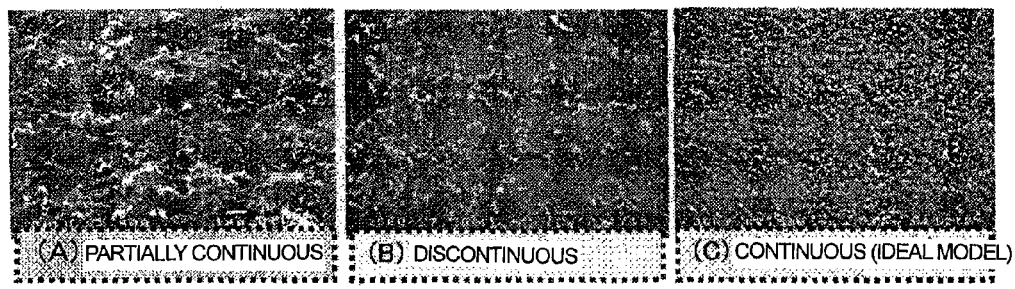
FIG. 2 shows micrographs representing the states (A), (B), and (C), respectively, of FIG. 1; (A), a partially continuous model in which image defects occur by the microscopic resistance variations caused by aggregation of the carbon black; (B), a discontinuous model in which uniformly dispersed carbon black enables control of semiconductivity but with varying resistivities due to mechanical or electrical stress; (C), a continuous (ideal) model in which conductivity is imparted solely by the effect of carbon black chain conferred by a high carbon load, and is determined by the powder resistance of the carbon black.

The following describes the present invention in more detail based on Examples and Comparative Examples. It should be noted, however, that the invention is in no way limited by the descriptions of the following examples.

The measurements of various physical properties were made according to the following methods.

(1) Nitrogen Adsorption Surface Area

The nitrogen adsorption surface area was measured according to JIS K6217 (low-temperature nitrogen adsorption method). In addition, the property data of commercially available carbons were used.

(2) DBP Absorption

DBP Absorption was measured according to JIS K6217. In addition, the property data of commercially available carbons were used.

(3) Volatile Content of Carbon Black

The volatile content was measured according to JIS K6221. Specifically, the carbon black was heated at 950° C. for 7 minutes, and the percentage weight reduction (weight %) of the carbon black with respect to the original weight was measured.

(4) Carbon Black pH

The pH value was obtained by measuring the pH of a mixture of the carbon black and distilled water using a glass electrode meter.

(5) Amount of Undecomposed Feedstock Hydrocarbon (PAH) Extracted from Carbon Black 5 g of carbon black was placed in a cylindrical glass filter paper after drying at 80° C. for 24 hours, and Soxhlet extraction was performed for 48 hours using 180 cc of monochlorobenzene as the solvent. The extract was concentrated, and the amount of extract was quantified using a liquid chromatogram. The result was divided by the carbon black weight to find the content. A liquid chromatograph analyzer, LC-6A (Shimadzu), a flow controller, SCL-6A (Shimadzu), and a detector, Waters 490E (Millipore; 5 µl injection) were used.

(6) Particle Size of Carbon Black

The particle size of carbon black in the solution was measured using a laser diffraction/scattering particle size distribution analyzer LA-920 (Horiba).

(7) Solid and Solid Content of Polyamic Acid Solution Composition

The solid content of the carbon black-dispersed polyamic acid solution composition was calculated as follows. A sample was precisely weighed in a heat-resistant container such as a metal cup (sample weight A (g)). The sample in the heat-resistant container was placed in an electric oven and dried by heating the container in a successively increasing temperature cycle of 120° C.×15 minutes, 180° C.×15 minutes, 260° C.×30 minutes, and 300° C.×30 minutes. After drying, the weight of the solid of the sample was measured (solid weight B (g)). The values A and B were measured for 5 samples (n=5) obtained from the same specimen, and the solid content was determined using the equation below. The average of the 5 samples was used as the solid content.

Solid Content=$B/A$×100(%)

(8) Weight-Average Molecular Weight of Polyamic Acid

The weight-average molecular weight used herein was measured using a GPC method (solvent, NMP; in terms of polyethylene oxide)

(9) Surface Resistivity of Semiconductive Belt

The surface resistivity (SR) was measured using a 400-mm sample cut off from the product semiconductive belt. The resistivity was measured at a total of 12 points, i.e., three equally-spaced points along the width direction, and four equally-spaced points along the circumferential direction, using a resistivity meter Hiresta IP•UR probe (Mitsubishi Chemical Corporation). The average of these values was used as the surface resistivity of the semiconductive belt. The SR value was measured after 10 seconds of 500 V voltage application.

Production Example 1

Three kinds of carbon black were prepared according to an ordinary oil furnace process, using ethylene bottom oil as the feedstock oil, and coke oven gas for combustion. Deionized water treated with ion-exchange resin was used to terminate the reaction.

800 g of the carbon black was placed in a cylindrical kiln measuring 50 cm in inner diameter and 80 cm in length. Then, the carbon black was allowed to catalytically react with 10 wt % ozone gas supplied into the kiln from the bottom. The 10 wt % ozone gas was prepared with an ozone generator (PCI, U.S.), using 100% oxygen as the feedstock gas. The nitrogen oxide content of the ozone gas was 0 ppm. The properties of the resulting carbon blacks (CB1 to CB3) are shown in Table 1.

The table also shows the properties of commercially available carbon blacks: carbon black MA 100 (Mitsubishi Chemical Corporation), and carbon black Special Black 4 (SB 4; Degussa).

TABLE 1

|  | CB1 | CB2 | CB3 | MA-100 | SB 4 |
| --- | --- | --- | --- | --- | --- |
| Method of production | Oil furnace | Oil furnace | Oil furnace | Oil furnace | Channel |
| pH | 2.7 | 2.4 | 2.3 | 3.5 | 3.0 |
| Volatile content (%) | 2.6 | 3.3 | 5.1 | 1.5 | 14.0 |
| Specific surface area ($m^2/g$) | 98 | 118 | 122 | 110 | 180 |

TABLE 1-continued

|  | CB1 | CB2 | CB3 | MA-100 | SB 4 |
|---|---|---|---|---|---|
| DBP absorption (ml/100 g) | 91 | 75 | 68 | 100 | 230 |
| Amount of extracted PAH (ppm) | 1.0 | 0.8 | 0.6 | 1.1 | 16.0 |

Example 1

50 kg of a polyamic acid solution (weight-average molecular weight of 29,000) was prepared by a synthesis of 3,3',4,4'-biphenyltetracarboxylic dianhydride and 4,4'-diaminodiphenyl ether in NMP. The polyamic acid solution had a viscosity of 3.0 Pa·s, and a solid content of 18.0 weight %. Carbon black CB1 and NMP were added to 10 kg of the solution, and the carbon black was uniformly dispersed therein using a sand mill. Dispersion conditions were set so that the average particle diameter of the carbon black in the solution would be 0.5 μm or less. This diameter was used as the indication of uniform dispersion. The properties of the resulting carbon black-dispersed polyamic acid solution compositions are shown in Table 2.

Example 2

The carbon black-dispersed polyamic acid solution composition was prepared as in Example 1, except for using CB2 instead of CB1. The properties of the resulting composition are shown in Table 2.

Example 3

The carbon black-dispersed polyamic acid solution composition was prepared as in Example 1, except for using CB3 instead of CB1. The properties of the resulting composition are shown in Table 2.

Comparative Example 1

A carbon black-dispersed polyamic acid solution composition was prepared as in Example 1, except for using MA 100 (Mitsubishi Chemical Corporation) instead of CB1. A large amount of NMP was required to uniformly disperse the carbon black with an average particle diameter of 0.5 μm or less. Accordingly, the volatile content was low. The properties of the composition are shown in Table 2.

Comparative Example 2

A carbon black-dispersed polyamic acid solution composition was prepared as in Example 1, except for using Special Black 4 (Degussa) instead of CB1. A large amount of NMP was required to uniformly disperse the carbon black with an average particle diameter of 0.5 μm or less. Accordingly, the solid content was low. The properties of the composition are shown in Table 2.

TABLE 2

|  | Ex. 1 Solution 1 | Ex. 2 Solution 2 | Ex. 3 Solution 3 | Com. Ex. 1 Solution 4 | Com. Ex. 2 Solution 5 |
|---|---|---|---|---|---|
| Carbon black | CB1 | CB2 | CB3 | MA-100 | SB 4 |
| Solid content (weight %) | 23.43 | 23.43 | 23.43 | 17.5 | 17.5 |
| Carbon black content (weight %) | 30 | 30 | 30 | 30 | 30 |
| Viscosity (Pa·s) | 3.3 | 3.4 | 3.6 | 2.2 | 2.4 |
| Average particle diameter (μm) | 0.252 | 0.285 | 0.282 | 0.416 | 0.382 |
| Maximum particle diameter (μm) | 0.510 | 0.584 | 0.510 | 3.409 | 0.877 |

Example 4

Production of Semiconductive Polyimide Resin Belt by Rotational Molding

Liquid feedstocks of varying carbon black contents were prepared from the carbon black-dispersed polyamic acid solution compositions (solutions 1 to 5) of Examples 1, 2, and 3, and Comparative Examples 1 and 2.

Each liquid feedstock was applied in a uniform width of 480 mm over the inner surface of a cylindrical mold (outer diameter, 324 mm; inner diameter, 300 mm; length, 500 mm) using a spray method, with the cylindrical mold being rotated at a centrifugal acceleration 4.0 times the gravitational acceleration. The coating thickness was calculated from the solid content so as to make the thickness of the intermediate transfer member 100 μm. The coating was heated to 120° C. over a period of 60 minutes, and dried at 120° C. for 90 minutes on the cylindrical mold being rotated at a centrifugal acceleration 4.0 times the gravitational acceleration.

The coating, adhered to the inner surface of the cylindrical mold, was then charged into a high-temperature furnace, where it was heated to 320° C. over a period of 120 minutes, and maintained for 60 minutes at 320° C. to complete the polyimide conversion. After cooling to room temperature, the semiconductive polyimide belt was removed from the mold.

Figure 3:
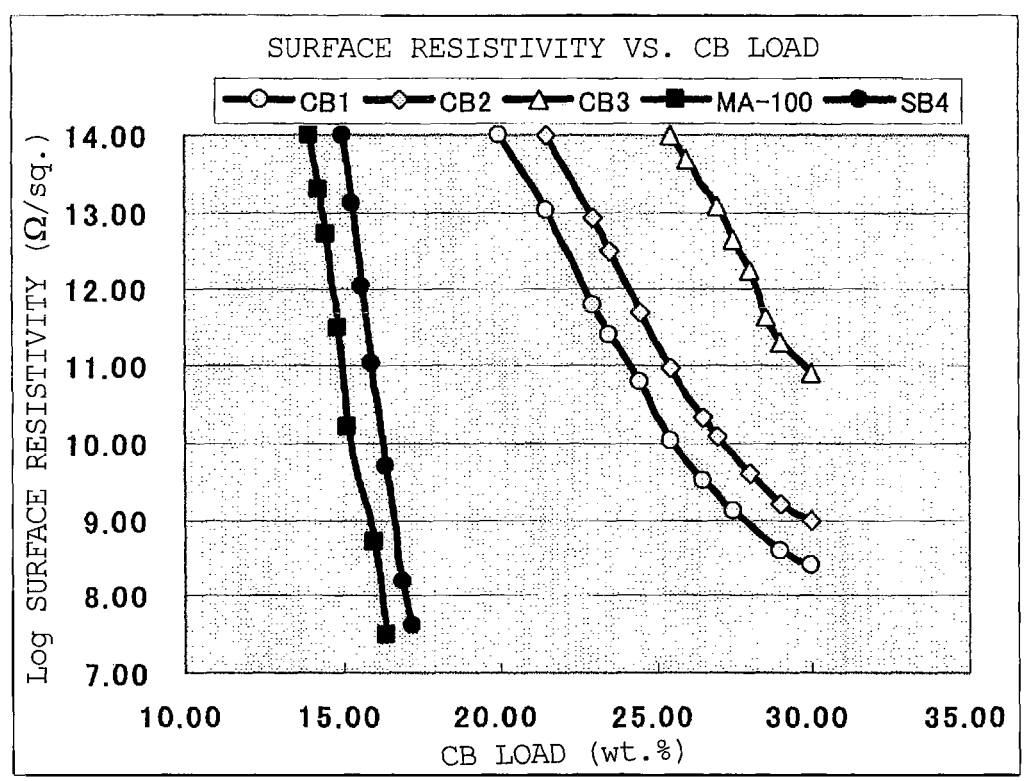
FIG. 3 is a plot of surface resistivity versus carbon black load of a semiconductive polyimide resin belt as measured in Example 4.

FIG. 3 represents a plot of surface resistivity versus carbon black load of each semiconductive polyimide belt obtained as above.

As can be seen from FIG. 3, in MA 100 and SB4, the effect of carbon black chain increases conductivity even with a carbon black content of the polyimide resin as small as 20 weight %, making it impossible to control conductivity in the semiconductive range (about $10^9$ to $10^{14}$ Ω/sq.) necessary for the intermediate transfer belt. Specifically, the surface resistivity falls to $1 \times 10^8$ Ω/sq. or less (under the range).

On the other hand, in CB1, CB2, and CB3, the carbon black content of the polyimide resin can be increased to 20 weight % or more, enabling the carbon black chain to impart conductivity, and realizing stable electrical properties not easily affected by external environment and applied voltage. Further, the slope becomes more gradual in the plot of surface resistivity versus the carbon black load of the polyimide resin. There accordingly will be no abrupt fluctuations of surface resistivity in response to small changes in carbon black load during belt production, making it easier to control resistance.

Example 5

10 kg of a polyamic acid solution (weight-average molecular weight of 24,000) was prepared by a synthesis of 3,3',4,4'-biphenyltetracarboxylic dianhydride and 4,4'-diaminodiphenyl ether in NMP. The polyamic acid solution had a viscosity of 3.0 Pa·s, and a solid content of 19 weight %. 570 g of CB1 and 100 g of NMP were added to the solution, and the carbon black was uniformly dispersed therein using a sand mill.

The carbon black-dispersed polyamic acid solution composition had a solid content of 23.15 weight %, and the carbon black content of the solid was 23.1 weight %. The carbon black in the solution had an average particle diameter of 0.243 μm, and a maximum particle diameter of 0.421 μm.

The carbon black-dispersed polyamic acid solution composition was used to produce a semiconductive polyimide belt by rotational molding as in Example 4. The surface condition, surface resistivity, and thickness of the semiconductive polyimide belt are shown in Table 3.

Example 6

4,4'-Diaminodiphenyl ether (100 mol %) was dissolved in an NMP, and 2,3,3',4'-biphenyltetracarboxylic dianhydride (20 mol %) and 3,3',4,4'-biphenyltetracarboxylic dianhydride (80 mol %) were added to the solution. Then, water was added to synthesize 5 kg of a polyamic acid solution (weight-average molecular weight: 12,000) in a manner described in JP-B-2-3820. The polyamic acid solution had a viscosity of 5.5 Pa·s, and a solid content of 30.0 weight %. 510 g of CB2 and 1,000 g of NMP were added to the solution, and the carbon black was uniformly dispersed therein using a sand mill.

The carbon black-dispersed polyamic acid solution composition had a solid content of 30.87 weight %, and the carbon black content of the solid was 25.4 weight %. The carbon black in the solution had an average particle diameter of 0.281 μm, and a maximum particle diameter of 0.51 μm.

The carbon black-dispersed polyamic acid solution composition was used to produce a semiconductive polyimide belt by rotational molding as in Example 4. The surface condition, surface resistivity, and thickness of the semiconductive polyimide belt are shown in Table 3.

Example 7

4,4'-Diaminodiphenyl ether (100 mol %) was dissolved in an NMP, and 2,3,3',4'-biphenyltetracarboxylic dianhydride (50 mol %) and 3,3',4,4'-biphenyltetracarboxylic dianhydride (50 mol %) were added to the solution to synthesize 5 kg of a polyamic acid solution (weight-average molecular weight: 7,000). The polyamic acid solution had a viscosity of 6.5 Pa·s, and a solid content of 38.0 weight %. 750 g of CB3 and 1,200 g of NMP were added to the solution, and the carbon black was uniformly dispersed therein using a sand mill.

The carbon black-dispersed polyamic acid solution composition had a solid content of 38.13 weight %, and the carbon black content of the solid was 28.3 weight %. The carbon black in the solution had an average particle diameter of 0.253 μm, and a maximum particle diameter of 0.45 μm.

The carbon black-dispersed polyamic acid solution composition was used to produce a semiconductive polyimide belt by rotational molding as in Example 4. The surface condition, surface resistivity, and thickness of the semiconductive polyimide belt are shown in Table 3.

Comparative Example 3

10 kg of a polyamic acid solution (weight-average molecular weight of 32,000) was prepared by a synthesis of 3,3',4,4'-biphenyltetracarboxylic dianhydride and 4,4'-diaminodiphenyl ether in NMP. The polyamic acid solution had a viscosity of 5.0 Pa·s, and a solid content of 18.0 weight %. 320 g of MA 100 (Mitsubishi Chemical Corporation) and 3,000 g of NMP were added to the solution, and the carbon black was uniformly dispersed therein using a sand mill. Here, the amount of the NMP was 3,000 g, because the solution had a high viscosity, making it difficult to uniformly disperse the carbon black.

The carbon black-dispersed polyamic acid solution composition had a solid content of 15.92 weight %, and the carbon black content of the solid was 15.09 weight %. The carbon black in the solution had an average particle diameter of 0.51 μm and a maximum particle diameter of 3.26 μm.

The carbon black-dispersed polyamic acid solution composition was used to produce a semiconductive polyimide belt by rotational molding as in Example 4. The surface condition, surface resistivity, and thickness (average thickness) of the semiconductive polyimide belt are shown in Table 3.

TABLE 3

| | Solid content (weight %) | CB content (weight %) | Surface condition | Surface resistivity (Ω/sq.) | Thickness (μm) |
|---|---|---|---|---|---|
| Ex. 5 | 23.15 | 23.1 | Good | $6.4 \times 10^{11}$ | 98 to 103 |
| Ex. 6 | 30.87 | 25.4 | Good | $2.1 \times 10^{11}$ | 98 to 102 |
| Ex. 7 | 38.13 | 28.3 | Good | $1.3 \times 10^{12}$ | 98 to 102 |
| Com. Ex. 3 | 15.92 | 15.09 | Scale patterns | $2.0 \times 10^{11}$ | 96 to 103 |

It can be seen from Table 3 that the carbon black content of the polyimide resin can be increased by increasing the volatile content of the carbon black.

In Comparative Example 3, the solid content of the liquid feedstock is low, and it takes a long time to evaporate the large amount of organic polar solvent. Accordingly, production efficiency is very poor. Further, "floating" occurred, and scale-like patterns appeared as the dispersion state of the carbon black became nonuniform possibly due to factors such as the buoyancy and the surface tension that cause heat convection or evaporative convection in the drying step of rotational molding, and viscosity and density changes that occur as the solvent evaporates.

With the semiconductive polyimide belts of Examples 5, 6, and 7 used as the image transfer belt of a color image-forming unit, stability and suitable removal of charge were ensured, and a stable, high-quality transfer image was obtained over extended time periods.

The invention claimed is:

1. A carbon black-dispersed polyamic acid solution composition, comprising: a polyamic acid solution obtained by a reaction of substantially equimolar amounts of biphenyltetracarboxylic dianhydride and aromatic diamine; and a carbon black of 2% to 6% volatile content produced by an oil furnace process,
   the carbon black having a pH of 2 to 4, a nitrogen absorption specific surface area of 90 to 130 $m^2$/g, a DBP absorption of 40 to 120 ml/100 g, a powder resistance of 3 to 30 Ω/cm, and containing PAH in an extracted amount of 10 ppm or less,
   the solution composition having a solid content of 23 weight % or more, and the solid having a carbon black content of 20 to 30 weight %.

2. A carbon black-dispersed polyamic acid solution composition according to claim 1, wherein the carbon black has been subjected to an oxidation treatment using an oxidizing agent that contains ozone.

3. A carbon black-dispersed polyamic acid solution composition according to claim 1, wherein the polyamic acid solution is a solution of polyamic acid having a weight-average molecular weight of 30,000 or less.

4. A carbon black-dispersed polyamic acid solution composition according to claim 1, wherein the biphenyltetracarboxylic dianhydride contains about 10 to 80 mol % asymmetric 2,3,3',4'-biphenyltetracarboxylic dianhydride, and wherein the aromatic diamine is 4,4'-diaminodiphenyl ether.

5. A process for producing a semiconductive polyimide resin belt by rotational molding of a carbon-black-dispersed polyamic acid solution composition of claim 1 into a tube, followed by imidization by a heat treatment, the process comprising:
(1) applying the carbon black-dispersed polyamic acid solution composition in uniform thickness over an inner surface of a cylindrical mold being rotated at a centrifugal acceleration about 0.5 to 8 times the gravitational acceleration;
(2) forming a self-supporting coating by applying a heat of about 100° C. to 140° C. to the cylindrical mold being rotated at a centrifugal acceleration about 0.5 to 8 times the gravitational acceleration; and
(3) imidizing the coating at a temperature of about 300° C. or more, with the coating being adhered to the inner surface of the cylindrical mold.

6. A semiconductive polyimide resin belt produced by a process of claim 5.

7. An intermediate transfer belt for an electrophotographic apparatus, wherein the intermediate transfer belt is formed of a semiconductive polyimide resin belt of claim 6.

* * * * *